United States Patent [19]

Tsuchida et al.

[11] Patent Number: 5,703,936
[45] Date of Patent: Dec. 30, 1997

[54] COMMUNICATION APPARATUS RECEIVING INFORMATION FROM PORTABLE INFORMATION MEDIUM

[75] Inventors: Shinji Tsuchida, Zama; Shoichi Takashima, Tokyo; Michihiro Izumi, Yokohama, all of Japan

[73] Assignee: Canon Kabushiki Kaisha, Tokyo, Japan

[21] Appl. No.: 390,169

[22] Filed: Feb. 17, 1995

Related U.S. Application Data

[63] Continuation of Ser. No. 130,426, Oct. 1, 1993, abandoned, which is a continuation of Ser. No. 677,134, Mar. 29, 1991, abandoned.

[30] Foreign Application Priority Data

| Apr. 2, 1990 | [JP] | Japan | 2-088803 |
| Apr. 2, 1990 | [JP] | Japan | 2-088804 |

[51] Int. Cl.⁶ .................................................. H04M 1/64
[52] U.S. Cl. .................. 379/88; 379/142; 379/199; 379/354; 379/357
[58] Field of Search .................... 379/142, 354, 355, 357, 67, 88, 89, 194–199, 200; 370/110.1

[56] References Cited

U.S. PATENT DOCUMENTS

| 4,680,785 | 7/1987 | Akiyama et al. | 379/57 |
| 4,750,169 | 6/1988 | Carse et al. | 370/110.1 |
| 4,759,056 | 7/1988 | Akiyama | 379/197 |
| 4,837,798 | 6/1989 | Cohen et al. | 379/94 |
| 4,853,952 | 8/1989 | Jachmann et al. | 379/88 |
| 4,924,496 | 5/1990 | Figa et al. | 379/142 |
| 4,972,462 | 11/1990 | Shibata | 379/89 |
| 5,003,577 | 3/1991 | Ertz et al. | 379/89 |
| 5,119,414 | 6/1992 | Izumi | 379/157 |
| 5,200,994 | 4/1993 | Sasano et al. | 379/88 |

FOREIGN PATENT DOCUMENTS

| 0347155 | 12/1989 | European Pat. Off. |
| 1188062 | 10/1989 | Japan. |
| 2096449 | 6/1990 | Japan. |

OTHER PUBLICATIONS

"The SOPHO–SET family of digital telephone terminals for SOPHO–S PABSX" by C.M. Klik; Philips Telecommunication & Data Systems Review; vol. 47; No. I Mar. 1989, Hilversum (NL) pp. 1–14.

"Personal Telephone Services Using IC–Cards" by Naoki Matsuo et al.; IEEE Communications Magazine; vol. 27, No. 7, Jul. 1989 N.Y. pp. 41–48.

Primary Examiner—Fan S. Tsang
Attorney, Agent, or Firm—Fitzpatrick, Cella, Harper & Scinto

[57] ABSTRACT

In a telephone exchange apparatus according to this invention, a message or data can be registered in an information medium such as an electronic notebook at a location away from a telephone, and the information medium is attached to the telephone to load the registered data. With this simple operation, data can be registered in a plurality of telephone exchange apparatuses, or a message can be displayed on telephones, thereby preventing registration from being forgotten, and informing a message.

24 Claims, 15 Drawing Sheets

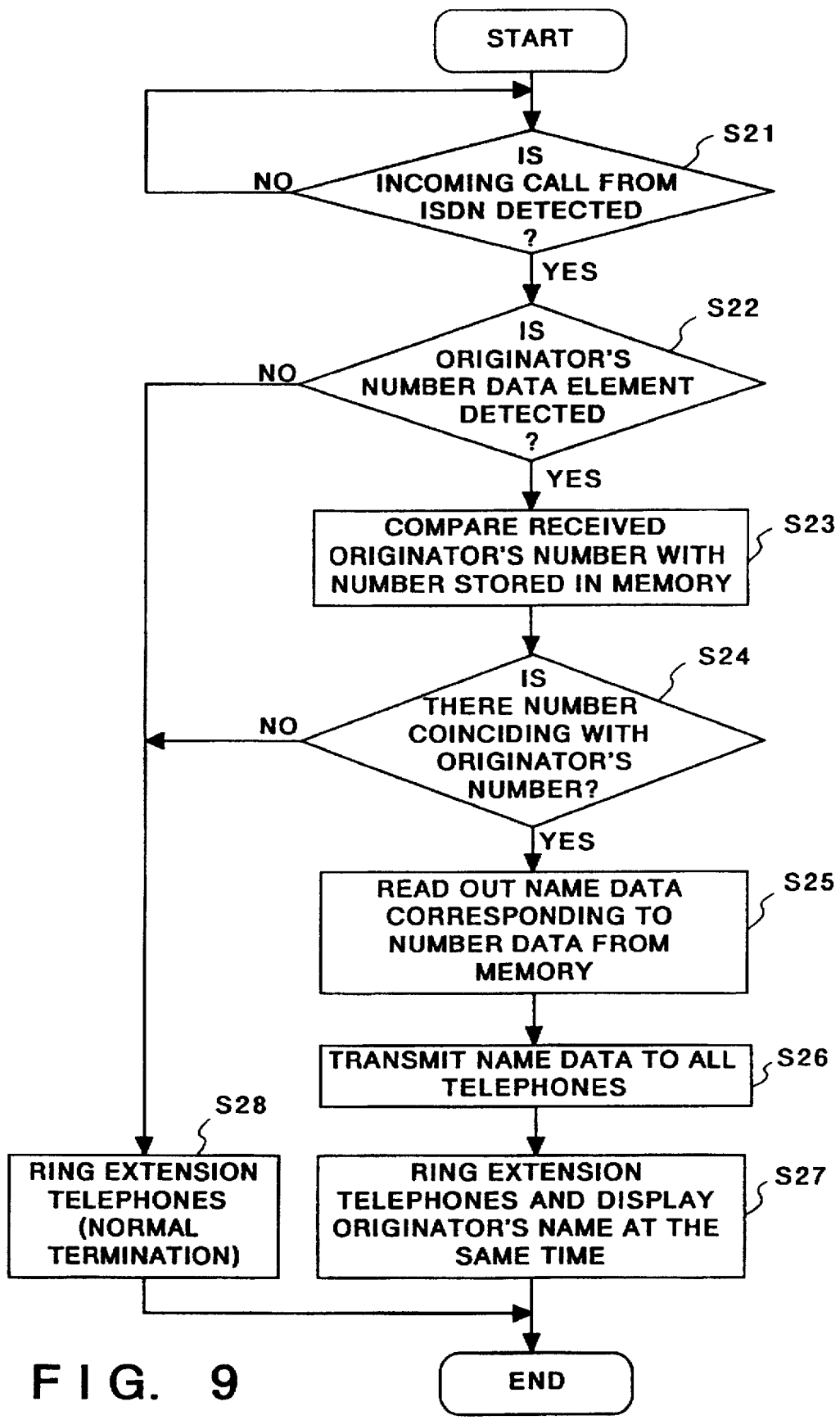
F I G. 9

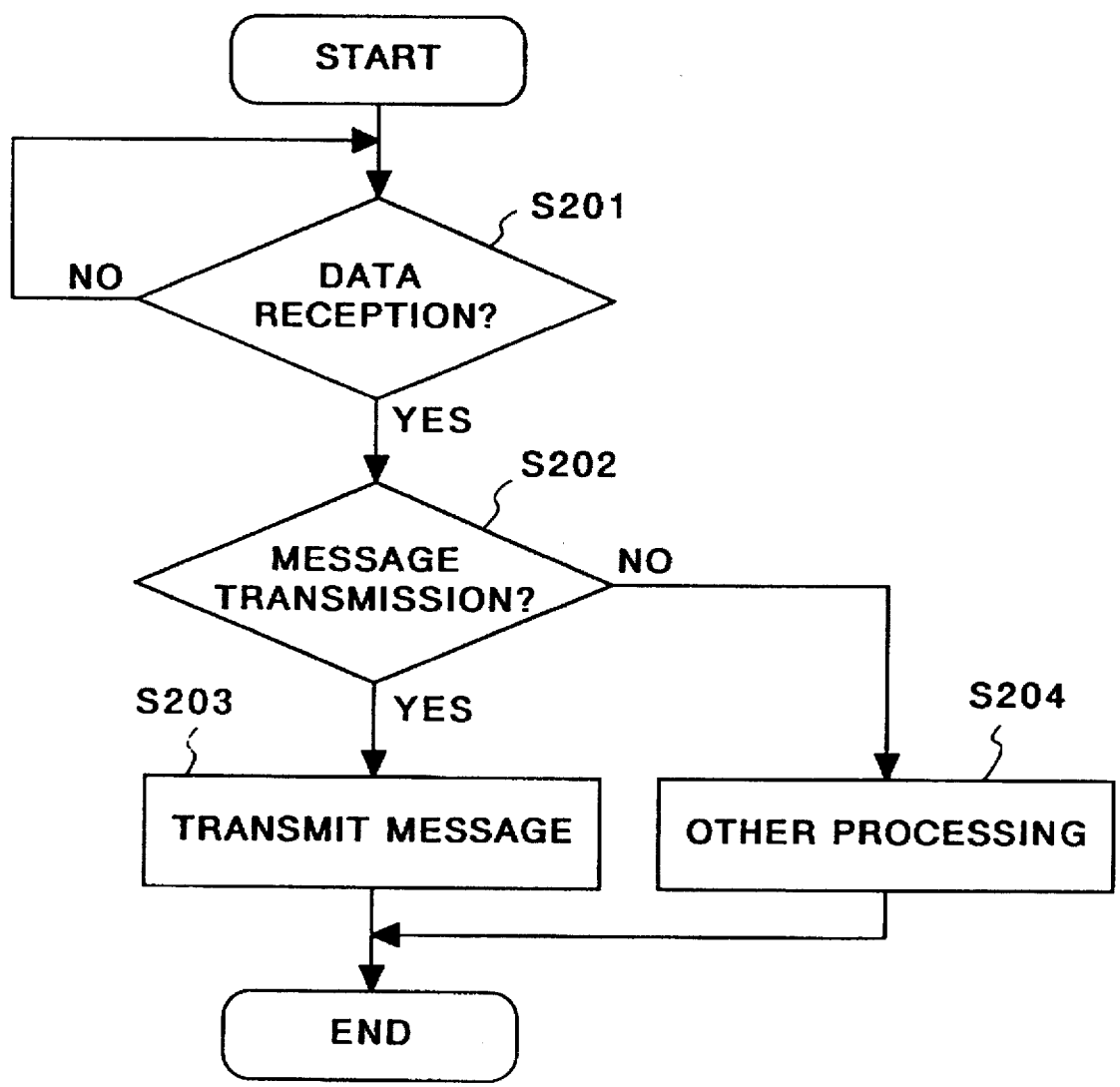
F I G. 12

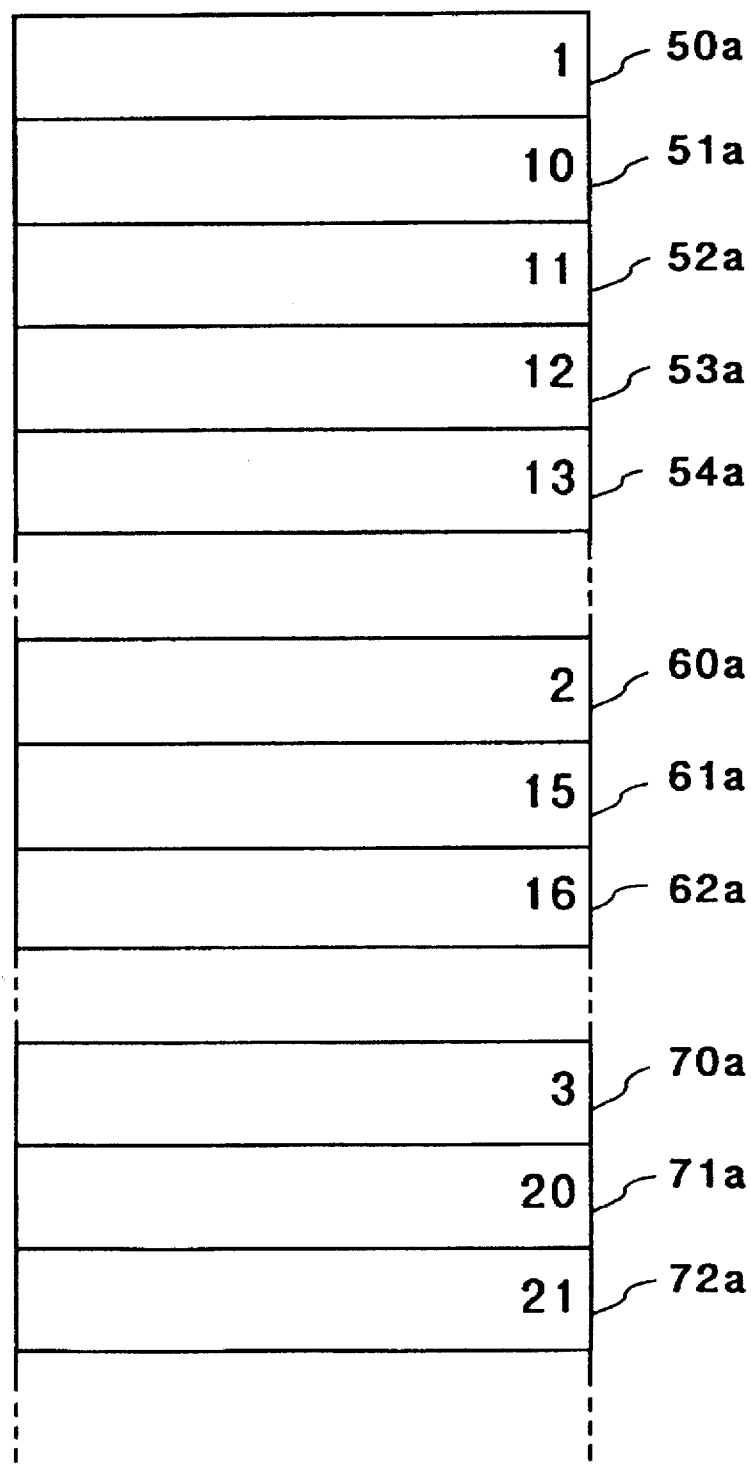
F I G. 16

COMMUNICATION APPARATUS RECEIVING INFORMATION FROM PORTABLE INFORMATION MEDIUM

This application is a continuation of application Ser. No. 08/130,426 filed Oct. 1, 1993, now abandoned, which is a continuation of application Ser. No. 07/677,134 filed Mar. 29, 1991, now abandoned.

FIELD OF THE INVENTION

The present invention relates to a communication apparatus and, more particularly, to a communication apparatus which can connect an information medium such as an electronic notebook, an IC card, or the like.

BACKGROUND OF THE INVENTION

In a conventional telephone exchange apparatus capable of transmitting a message to an extension telephone, an arbitrary message is selected from some fixed messages stored in the telephone exchange apparatus, and is transmitted to a destination extension telephone.

Some private branch exchanges (PBXs) or push-button telephones connected to a network such as an ISDN (integrated services digital network) having a function of sending an originator's number have the following function. When telephone numbers and corresponding names are registered in advance, and when an incoming call from a telephone with a registered telephone number is detected, an originator's name is displayed on a terminating extension telephone.

In this case, the telephone numbers and corresponding names are registered by depressing a ten-key pad on, e.g., an extension telephone.

However, in the prior art described above, since messages are fixed, even if a message is transmitted to a telephone of a called party, an originator cannot satisfactorily indicate his or her intention to the called party. Since no private message is included in the message group, it is impossible to transmit a private message.

In the prior art, since the registration is performed using the ten-key pad of the extension telephone, the following drawbacks are posed.

(1) When a user wants to perform registration while he or she is away from a telephone, he or she cannot perform registration immediately, and may often forget registration.

(2) When a user wants to register the same data in other systems, he or she must repeat the same registration operations.

SUMMARY OF THE INVENTION

It is an object of the present invention to provide a communication apparatus in which a received name is displayed corresponding to an originator's number.

It is another object of the present invention to provide a telephone exchange apparatus in which a desired message or information can be registered even at a location remote from a telephone.

It is another object of the present invention to provide an apparatus which can easily register a registered message or information in a plurality of telephone exchange apparatuses.

According to the present invention, the foregoing object is attained by providing a communication apparatus which performs communications through communication lines, comprising connection means for connecting an information medium, first reception means for receiving number data and name data from said information medium which is connected by said connection means, second reception means for receiving an originator's number from said communication lines, and output means for visually outputting the name data received by said first reception means corresponding to the originator's number received by said second reception means.

Preferably, the output means has a display or printer engine.

And in order to achieve the above object, there is provided, according to the present invention, a telephone exchange apparatus comprising connection means for connecting an information medium to the telephone, reception means for receiving data stored in the information medium through the connection means, storage means for storing the received data, discrimination means for discriminating a coincidence between the data stored in the storage means, and predetermined data, information means for informing the data stored in the storage means to the telephone on the basis of a discrimination result of the discrimination means, and control means for controlling the telephone on the basis of the data informed by the information means.

Preferably, the discrimination means discriminates a coincidence between specific data in the storage means, and destination number data received through a line as the predetermined data, and the information means informs data corresponding to the specific data to a specific telephone when the discrimination means determines the coincidence between the specific data and the destination number data.

Preferably, the information means informs the data stored in the storage means to only a telephone, to which the information medium is connected via the connection means, on the basis of the discrimination result of the discrimination means.

Preferably, the presence/absence of information of data from the information means is displayed on the telephone.

Preferably, the control means displays data informed by the information means on the telephone.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a flowchart showing terminating processing according to the first embodiment;

FIG. 12 is a flowchart showing a communication processing sequence according to the third embodiment;

FIG. 16 is a diagram showing the construction of a RAM according to the second embodiment.

DESCRIPTION OF THE PREFERRED EMBODIMENTS

[First Embodiment]

The first embodiment of the present invention will be described below.

In the embodiment to be described below, an electronic notebook is used as an information medium.

Figure 1:
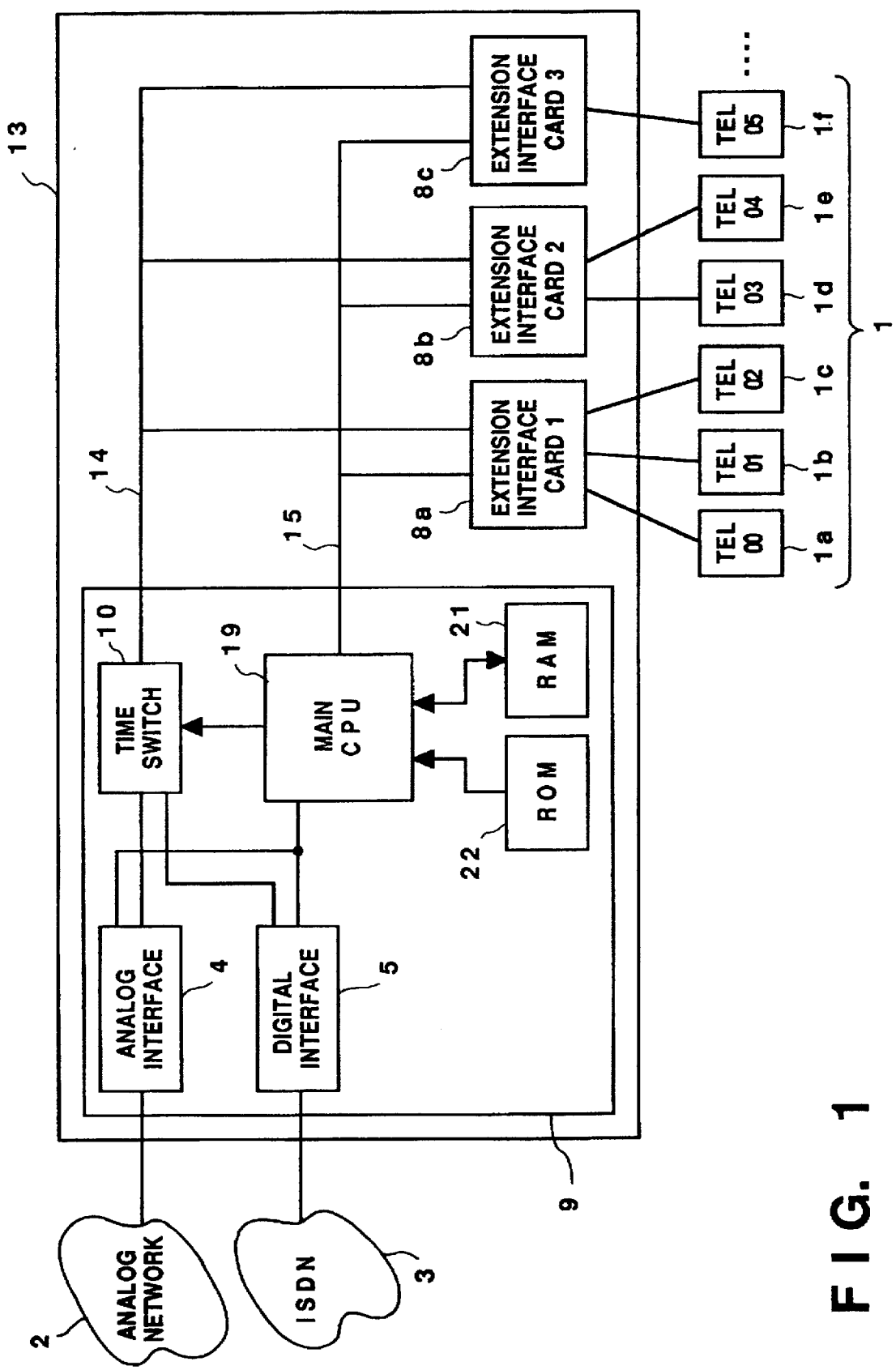
FIG. 1 is a block diagram showing an overall arrangement of a telephone exchange apparatus according to an embodiment of the present invention.

FIG. 1 is a block diagram showing the overall arrangement of a telephone exchange apparatus according to the first embodiment. In FIG. 1, a main unit 13 of the telephone exchange apparatus comprises an office line interface card 9, and extension interface cards 8a to 8c. The office line interface card 9 comprises a main CPU 19 for controlling the office line interface card 9 and the entire apparatus, a ROM 22 for storing a control program, a RAM 21 for storing control data, an analog interface 4 for accommodating an analog line from an analog network 2, a digital interface 5 for accommodating a digital line from an ISDN, and a time switch 10 for realizing time division exchange under the control of the main CPU 19.

Each of the extension interface cards 8a to 8c accommodates a plurality of extension telephones 1, and controls data transmission to the telephones and data reception from the telephones. Each extension interface card exchanges data with the main CPU 19 via a control line 15. Time division data exchange between extension interface cards 8a to 8c and the main CPU 19 is performed via a highway 14.

Figure 2:
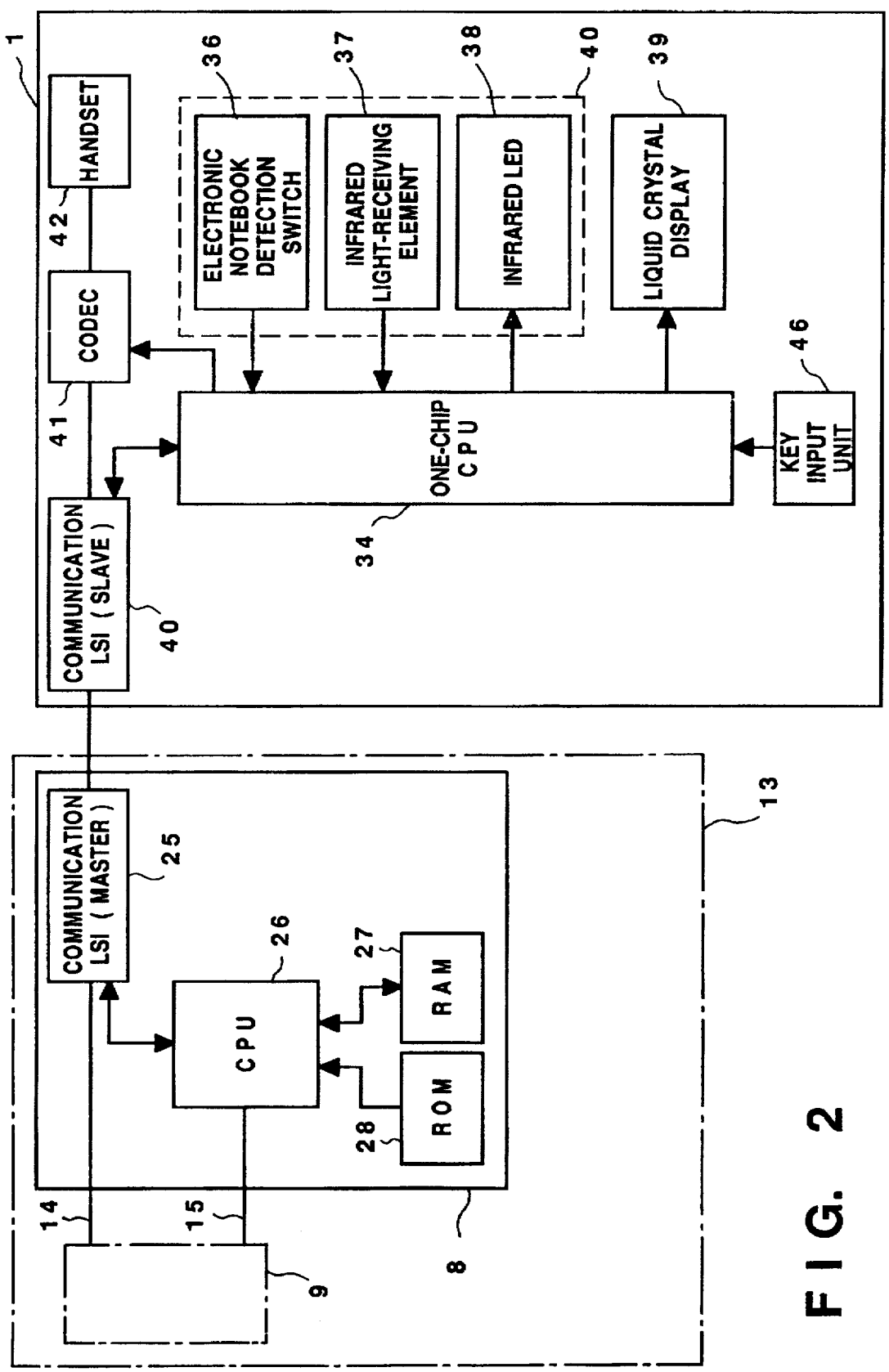
FIG. 2 is a block diagram showing internal arrangements of an extension interface card, and an extension telephone according to the embodiment shown in FIG. 1.

FIG. 2 is a block diagram showing internal arrangements of the extension interface card and the extension telephone of the apparatus according to the first embodiment.

In FIG. 2, the extension interface card 8 comprises a CPU 26 for controlling the entire extension interface card, a ROM 28 for storing a control program for the CPU 26, a RAM 27 for storing control data, and a communication LSI 25, inserted between the office line interface card 9 and the extension telephone 1, for exchanging data therebetween.

On the other hand, the extension telephone 1 comprises a one-chip CPU 34 which serves as a control unit for the entire telephone, and incorporates I/O ports, a ROM, and a RAM (none of which are shown), an electronic notebook connection interface 40, a key input section 46 for performing an operation, e.g., data transmission, and a liquid crystal display 39 for displaying, e.g., a message. The electronic notebook connection interface 40 comprises an electronic notebook detection switch 36 for detecting whether or not an electronic notebook is accommodated, an infrared light-receiving element 37 for exchanging data between the electronic notebook and the telephone, and an infrared LED 38.

A communication LSI 40 in the extension telephone 1 exchanges data with the extension interface card 8. Of data to be exchanged, communication audio data is demodulated by a CODEC 41, and the demodulated data is sent to a handset 42. Audio data from the handset 42 is modulated by the CODEC 41, and the modulated data is sent to the communication LSI 40.

Figure 3:
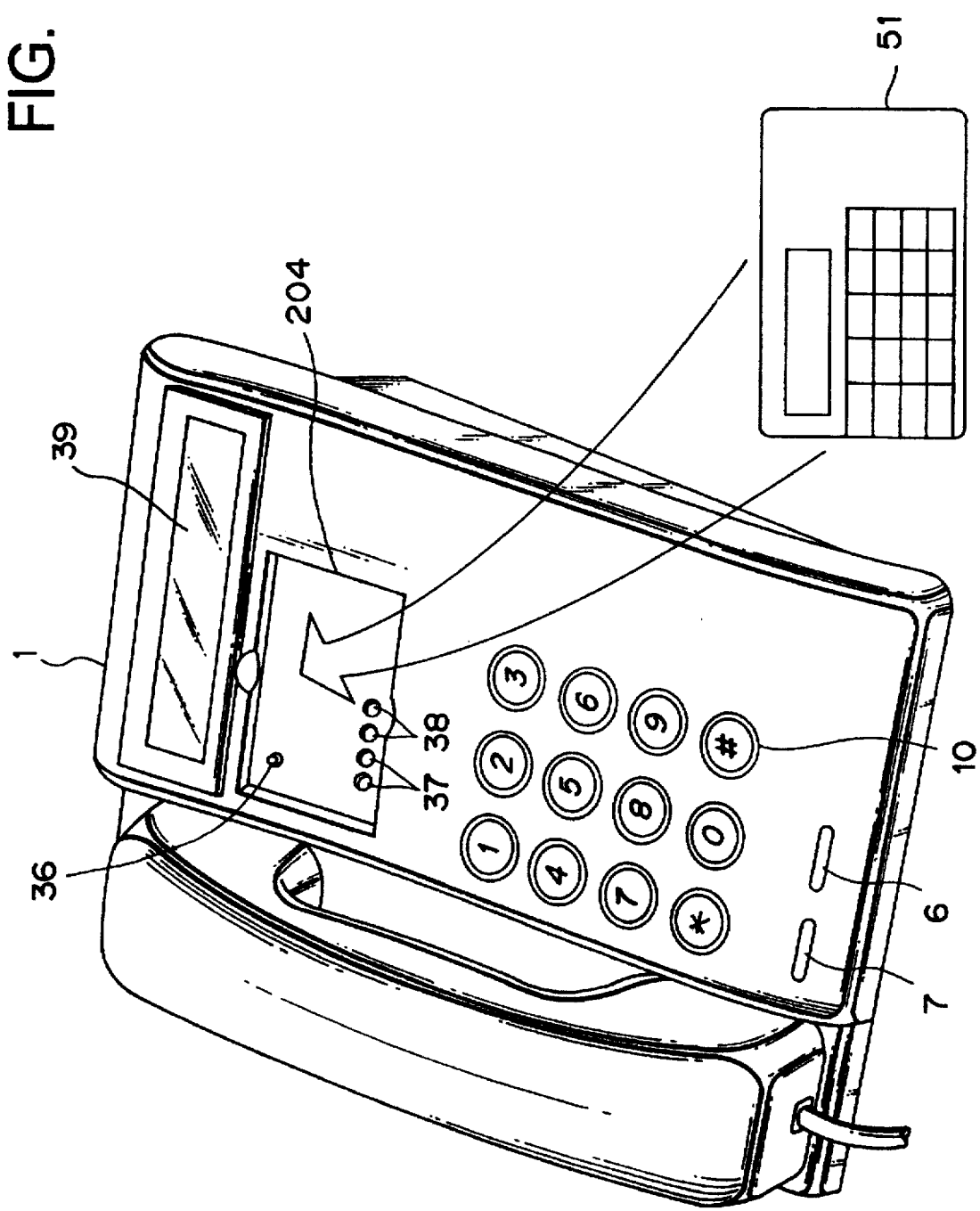
FIG. 3 is a perspective view of the extension telephone and an electronic notebook.

FIG. 3 shows an outside view of the extension telephone and the electronic notebook. In FIG. 3, reference numeral 1 denotes the telephone; 204, a base, having the electronic notebook connection interface, for receiving an electronic notebook; 51, an electronic notebook; 6, a data transmission key; 7, a cancel key; 36, an electronic notebook detection switch; 37, the infrared light-receiving elements; and 38, the infrared LEDs (light-emitting diodes).

(Data Input to Electronic Notebook)

Figure 6:
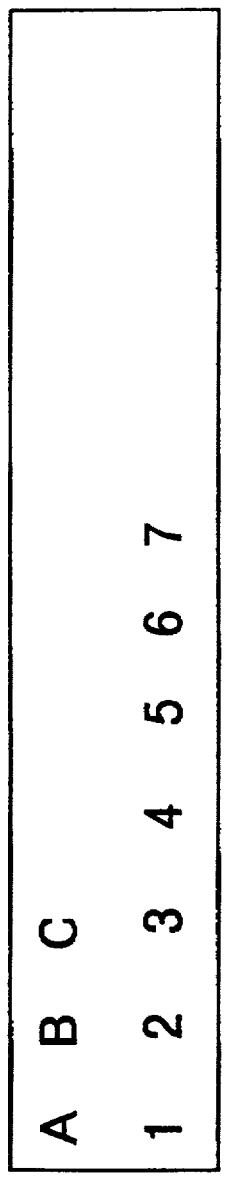
FIG. 6 shows a display on the electronic notebook in a data registration mode.

The electronic notebook 51 has a function of registering names and corresponding telephone numbers. FIG. 6 shows a display on the electronic notebook when data is registered. In FIG. 6, an upper column displays a name, and a lower column displays a telephone number.

Needless to say, the registration operation can be performed at a location away from the telephone exchange apparatus at any time. More specifically, when a user wants to register a given telephone number while he or she is away from the location, he or she can register the number before he forgets it.

(Communication Between Electronic Notebook and Telephone)

Figure 4:
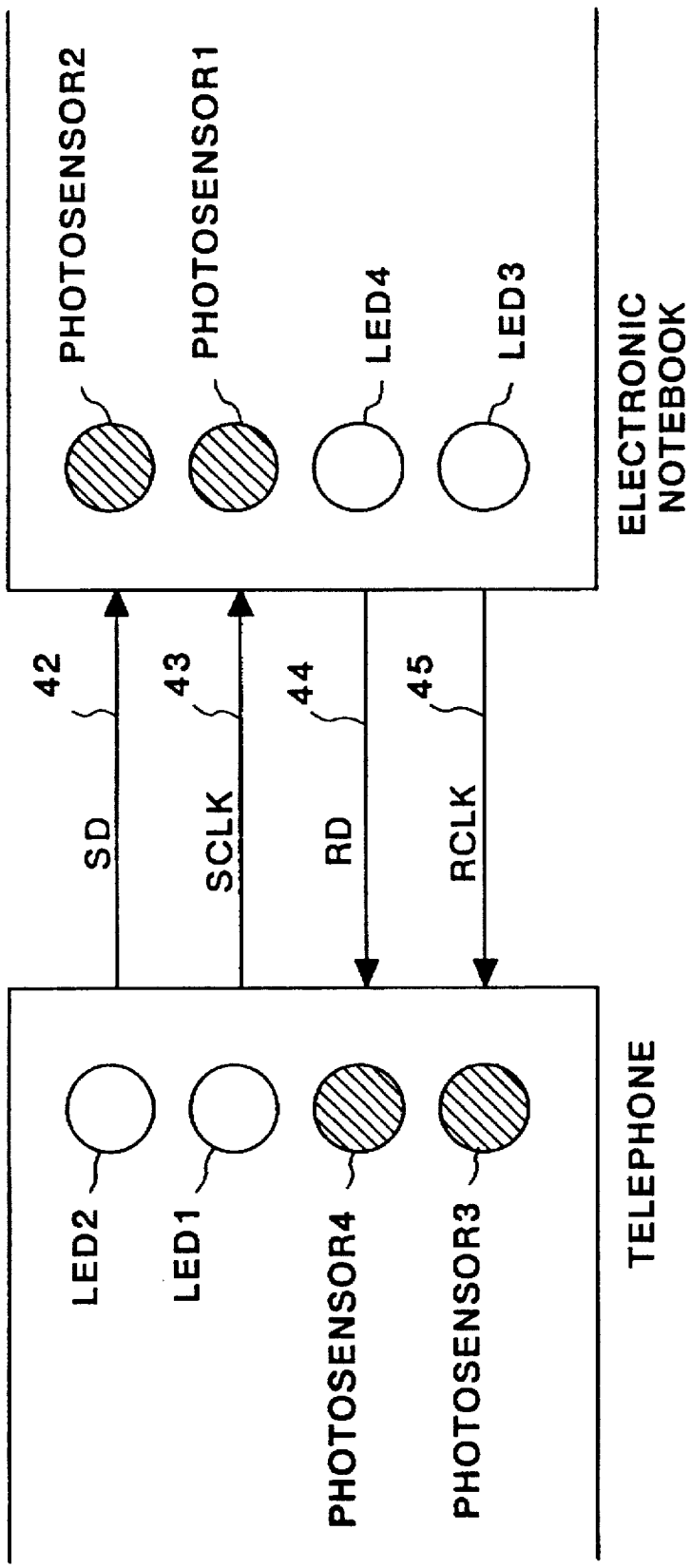
FIG. 4 is a view showing a communication method between the telephone and the electronic notebook.

A communication between the electronic notebook and the telephone is performed by four pairs of infrared LEDs and photosensors, as shown in FIG. 4.

In FIG. 4, SD 42 denotes transmission data from the telephone to the electronic notebook; SCLK 43, a bit timing signal for data transmitted from the telephone to the electronic notebook; RD 44, transmission data from the electronic notebook to the telephone; and RCLK 45, a bit timing signal for data transmitted from the electronic notebook to the telephone.

More specifically, when a communication is performed from the telephone to the electronic notebook, data defined by an LED 2 is changed in synchronism with a rising edge of a signal from an LED 1 in the telephone. In the electronic notebook, a photosensor 1 detects a change in the SCLK signal, and a data content (SD) from the LED 2 is read immediately after the falling edge of the SCLK signal 43 from the LED 1 is detected, so that data can be transmitted from the telephone to the electronic notebook.

Figure 5:
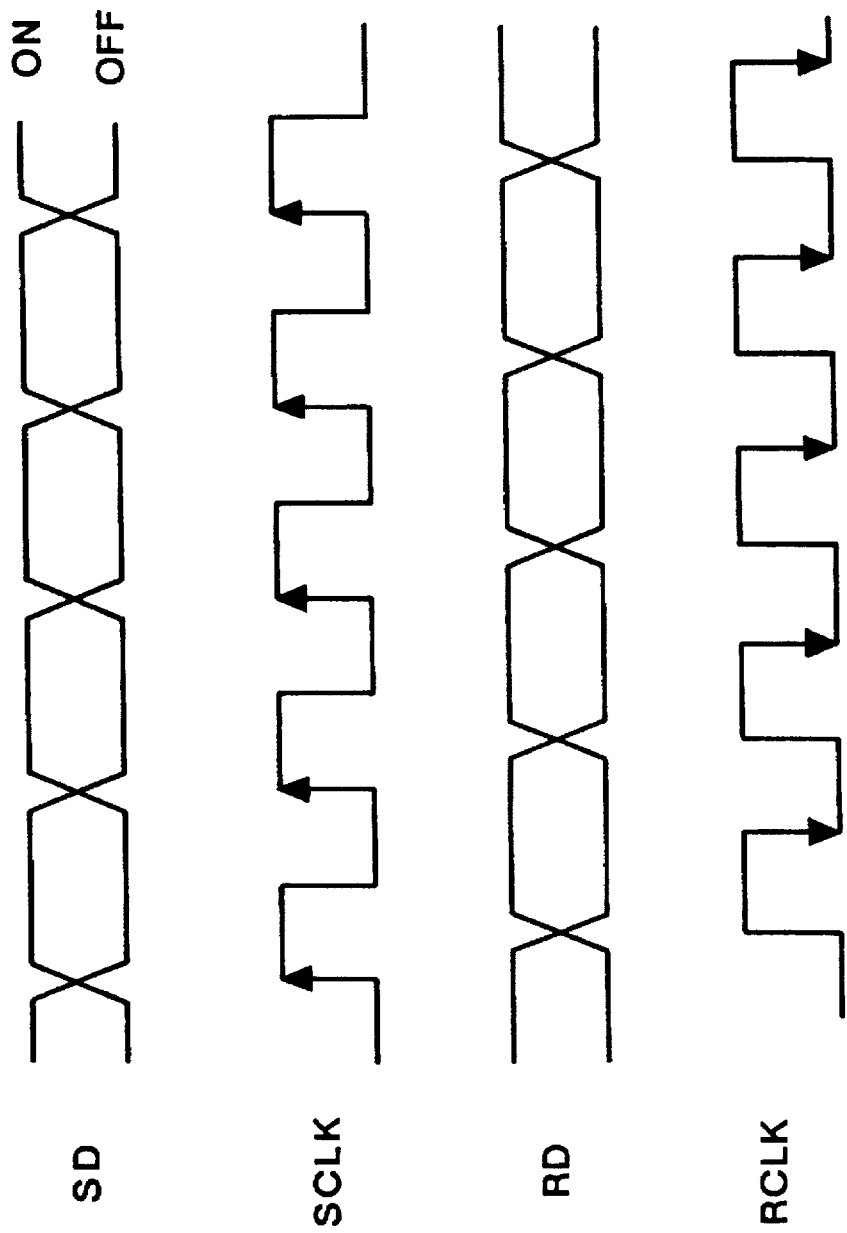
FIG. 5 is a timing chart showing data codes.

As data codes, JIS (Japanese Industrial Standard) codes are used, and character synchronization is attained by start-stop synchronization, so that character data is detected upon detection of start and stop bits. FIG. 5 illustrates this state.

A communication from the electronic notebook to the telephone is performed in the same manner as described above. More specifically, in the electronic notebook, an LED 4 transmits transmission data RD synchronized with the timing signal RCLK from an LED 3, and in the telephone, these data are received by photosensors 3 and 4.

(Data Registration from Electronic Notebook)

Figure 8:
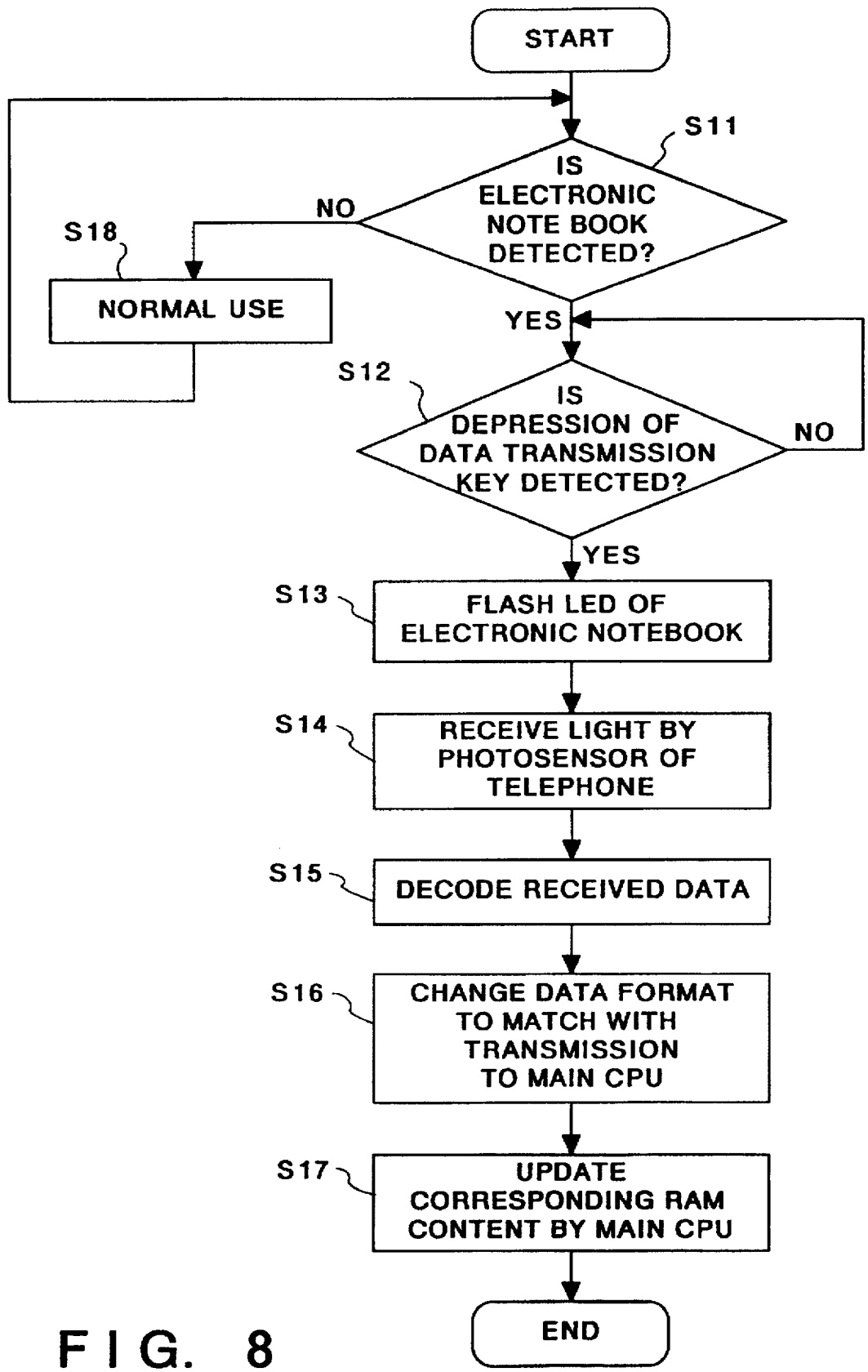
FIG. 8 is a flowchart showing a data registration operation of the electronic notebook.

FIG. 8 shows an operation flow executed when data is registered from the electronic notebook.

First, a power switch of the telephone exchange apparatus is turned on. Then the electronic notebook 51 is placed on the electronic notebook interface 40 of the telephone 1.

When the electronic notebook detection switch 36 is turned on, the one-chip CPU 34 detects that the electronic notebook 51 is set (step S11). When the data transmission key 6 on the telephone is depressed while the switch 36 is on (step S12), the one-chip CPU 34 of the telephone causes the LEDs 38 to flash at predetermined periods, thus sending a data transmission request to the electronic notebook 51.

Upon reception of the data transmission request, the electronic notebook 51 causes LEDs to flash in a pattern corresponding to telephone number data, and name data such as a person's name, which have been registered by the above-mentioned method (step S13). The infrared light-receiving elements 37 detect flashing of the LEDs (step S14), and convert the detection results into electrical signals. The electrical signals are supplied to the CPU 34. The CPU 34 of the extension telephone 1 decodes received data (step S15), converts the decoded data into a predetermined format between the main CPU 19 and the telephone (step S16), and transmits the converted data to the main unit by the following method.

Figure 7:
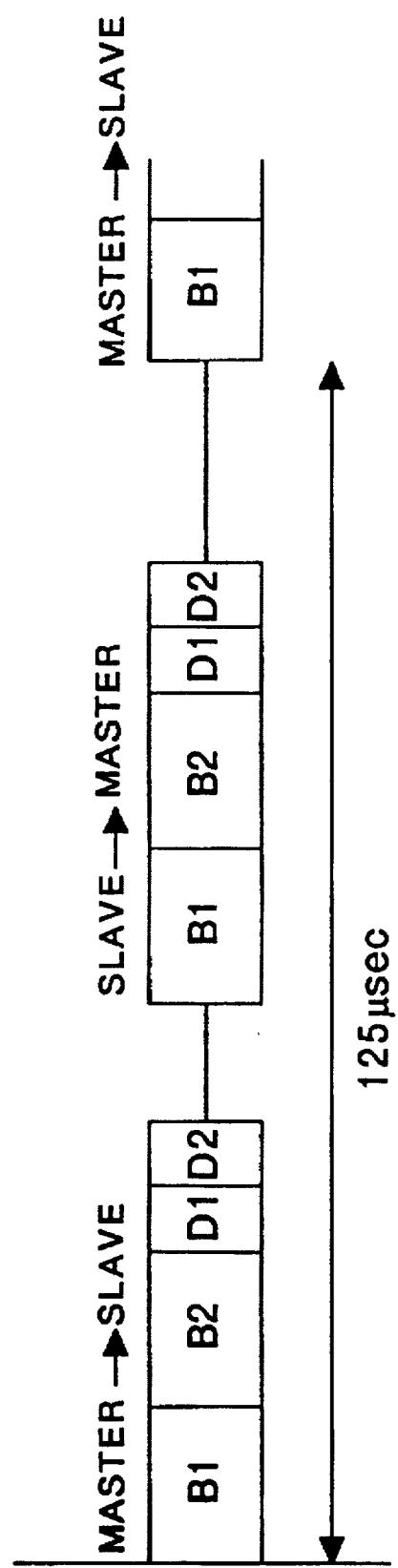
FIG. 7 shows a communication data format of this embodiment.

Communications among the main CPU 19, the highway, and the extension telephones are attained by a ping-pong transmission method. More specifically, burst data in a format shown in FIG. 7 shuttles along a two-wire cable. In FIG. 7, the burst data is transmitted while storing audio data in B1 and B2 channels, and control data between the main CPU 19 and each telephone, i.e., the above-mentioned setup data in a D1 channel. Note that a D2 channel is an auxiliary channel. Data transmission rates of these channels are: B1 and B2=64 Kbps (kilo bits per second); and D1 and D2=16 Kbps. One transmission cycle of the burst data is 125 μsec (microseconds).

After power-on, the main CPU 19 executes polling for the extension telephone 1. When the one-chip CPU 34 of the extension telephone subjected to polling has data to be transmitted to the main CPU 19 in its internal RAM, it transmits the data in the D1 channel. The setup data such as name data decoded previously is transmitted using the D1 channel. More specifically, when the one-chip CPU 34 is subjected to the polling from the main CPU 19 in a state wherein it has received number data and name data from the electronic notebook 51, and has converted them into a predetermined format, it stores the data in the D1 channel. The main CPU 19 receives the corresponding data, and when it determines that the received data are the number data and the name data transmitted from the electronic notebook, it stores these data in a predetermined area of the RAM 21 (step S17). In this case, data stored in the area so far is updated to new data.

In order to cancel data stored in the RAM 21, the cancel key 7 need only be depressed while the electronic notebook 51 is attached to the telephone. In this case, the one-chip CPU 34 determines depression of the cancel key 7, and sends cancel data in a predetermined format to the main CPU 19. Thus, the main CPU deletes the data in the RAM 21.

(Processing When Incoming Call from Communication Network is Detected)

Processing executed when an incoming call from a network (e.g., the ISDN) having a function of sending data of an originator's number will be described below with reference to FIG. 9.

In FIG. 9, when a setup message from the network is received (step S21), the main CPU 19 of the telephone exchange apparatus discriminates an originator's number data element in the setup message (step S22).

The main CPU 19 of the main unit searches number data prestored in the RAM 21 by a master telephone (step S23).

As a result, if there is no number data which coincides with the received originator's number data element (i.e., NO in step S24), normal terminating processing is performed, i.e., an operation for ringing all the extension telephones or a predetermined group of telephones (termination to the group of telephones) is performed to inform reception of an incoming call (step S28).

If it is determined YES in step S24, the main CPU 19 reads out name data corresponding to the detected number data (step S25), and sends the data to all the non-busy extension telephones (step S26). Upon reception of this data, the one-chip CPU 34 of the extension telephone rings a bell, and displays an originator's name on the display 39 (step S27).

In this embodiment, a communication between the electronic notebook and the telephone is performed by flashing the four LEDs. However, the same effect can be expected if other methods are employed.

For example, a function of exchanging electrical signals may be provided between the electronic notebook and the telephone, and data may be exchanged in a serial or parallel data format. A means for generating audio frequency band signals such as MF signals, PB signals, and the like may be arranged in the electronic notebook, and these signals may be recognized by the telephone. In this manner, data may be sent from the electronic notebook.

In this embodiment, the electronic notebook detection switch is used as a means for detecting the presence/absence of the electronic notebook. However, the same effect may be expected using an optical sensor.

Telephone numbers registered in the electronic notebook, and a one-touch dial function of the telephone may be associated with each other, so that a telephone number in the electronic notebook may be transmitted to the telephone in cooperation with a call originating operation by the telephone.

According to this embodiment, the following effects can be expected.

(1) When a user wants to register a telephone number at a location away from a telephone, he or she can immediately register it in the electronic notebook before he forgets it.

(2) When the same data is to be registered in other telephone exchange apparatuses the same registration operation need not be repeated.

(3) When a call originating operation is performed, the electronic notebook can be equivalently utilized as a one-touch dial function, and efficiency of a job using a telephone can be improved.

In the embodiment described above, name data sent from an electronic notebook 51 are stored in a RAM 21 in the main unit 13. However, they can be stored in a self-contained RAM of a one-chip CPU 34 of the telephone 1. In this case, the CPU 26 of the main unit 13 sends an originator's number data element to the extension telephone 1 when there is an incoming call. And the one-chip CPU 34 of the extension telephone 1, by referring to name data registered beforehand, displays the originator's name on the liquid crystal display 39 in accordance with the received originator's name data element.

This invention can be applied not only to key telephone systems, but to single line telephones or facsimile apparatuses which are connected directly to a public switched telephone network. More specifically, a facsimile apparatus can print out an originator's name by printer engine.

This invention can also be applied to a case where an originator's number is sent not only by the network, but also by an originating terminal.

[Modification]

In the above embodiment, name data is displayed on a plurality of telephones. However, in this modification, name data is displayed on a telephone at which the name data is registered.

In this modification, when name data is registered from the electronic notebook 51 to the main unit 13, the main CPU 19 registers name data, originator's number data, and data of a telephone number of a telephone which outputs these data in the RAM 21.

(Processing When Incoming Call from Communication Network is Detected)

Figure 10:
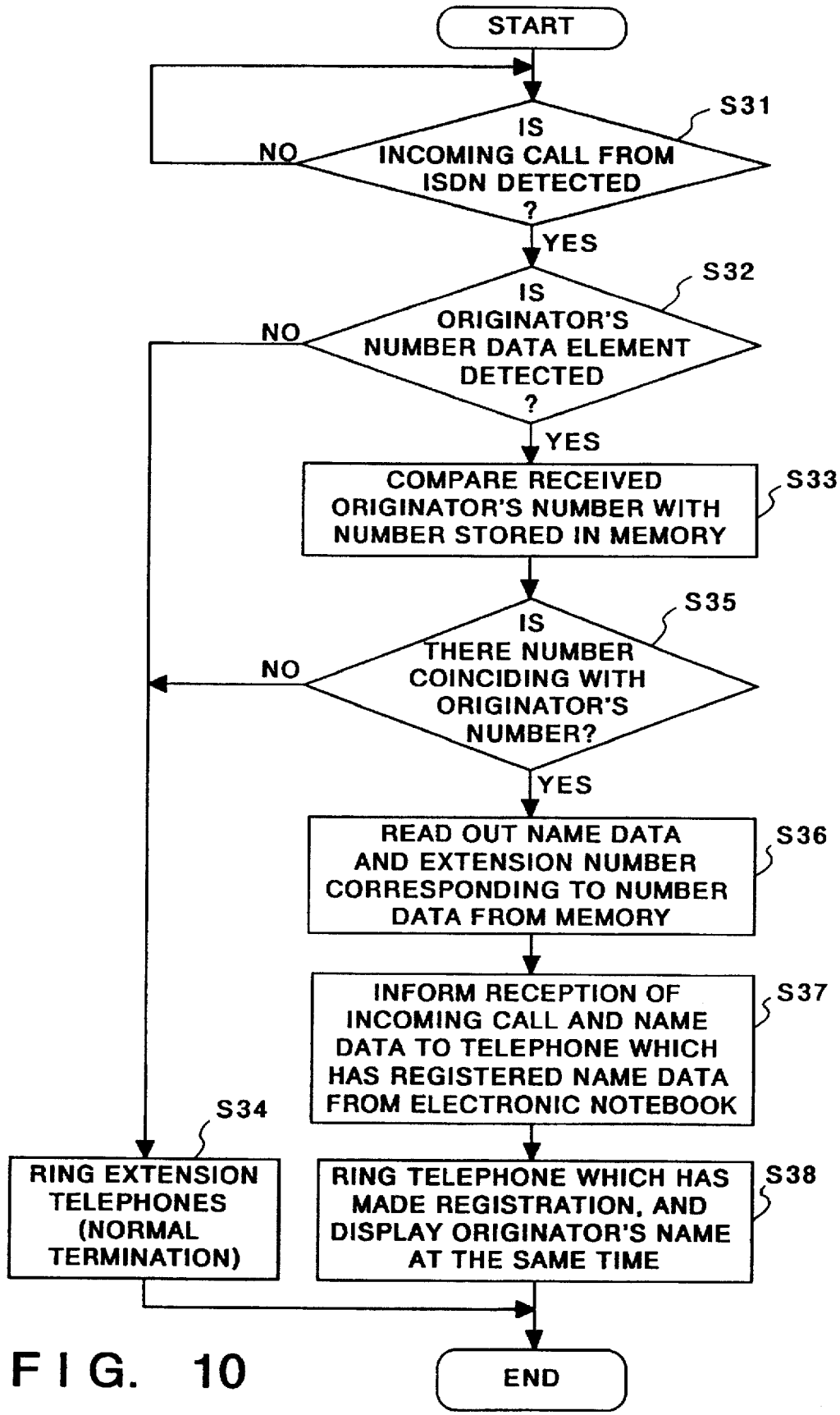
FIG. 10 is a flowchart showing terminating processing according to a modification.

FIG. 10 shows processing executed when an incoming call is received from a network (e.g., the ISDN) having a function of sending data of an originator's number.

In FIG. 10, when a setup message from the network is received (step S31), the main CPU 19 of the telephone exchange apparatus discriminates an originator's number data element in the setup message (step S32).

The main CPU 19 of the main unit searches number data prestored in the RAM 21 at a master telephone (step S33). As a result, if there is no number data which coincides with the received originator's number data element (i.e., NO in step S35), normal terminating processing is performed, i.e., an operation for ringing all the extension telephones or a predetermined group of telephones (group terminating) is performed to inform reception of an incoming call (step S34).

If the same data is detected (i.e., YES in step S35), the main CPU 19 reads out corresponding name data and an extension number of a telephone at which the name is registered (step S36), and sends the name data corresponding to the detected number data, and data indicating that an incoming call is received to the telephone on which the electronic notebook that has sent the number data is attached (step S37). Thus, a bell can be rung at the telephone attached with the electronic notebook at which the number data is registered, and an originator's name can be displayed (step S38). As a result, a possibility that a best suited person responds to the incoming call can be increased.

In this modification, a function of exchanging electrical signals may be provided between the electronic notebook and the telephone, and data may be exchanged in a serial or parallel data format. A means for generating audio frequency band signals such as MF signals, PB signals, and the like may be arranged in the electronic notebook, and these signals may be recognized by the telephone.

In addition, the electronic notebook may be detected by an optical sensor.

According to this modification, the following effects can be particularly expected. For example, a setting state can be updated in such a manner that ringing designation is canceled when a user of a telephone leaves his or her seat, or data is registered after the order of seats is changed. Thus, an optimal setting state can be established according to different situations. As a result, a possibility that a best suited person responds to an incoming call can be increased, and a transfer operation can be omitted. Therefore, job efficiency can be improved, and a wait time for an originator can be shortened.

[Second Embodiment]

The second embodiment of the present invention will be described below. Note that the arrangement of the overall telephone exchange apparatus of this embodiment, the office line interface card, the extension interface cards, and the like constituting the apparatus are the same as those in the first embodiment, and a detailed description thereof will be omitted.

In this embodiment, a case will be exemplified below wherein a user (to be referred to as Mr. A hereinafter) of an extension telephone 1a sends a message generated by an electronic notebook to a user (to be referred to as Mr. B hereinafter) of an extension telephone 1d.

Figure 11:
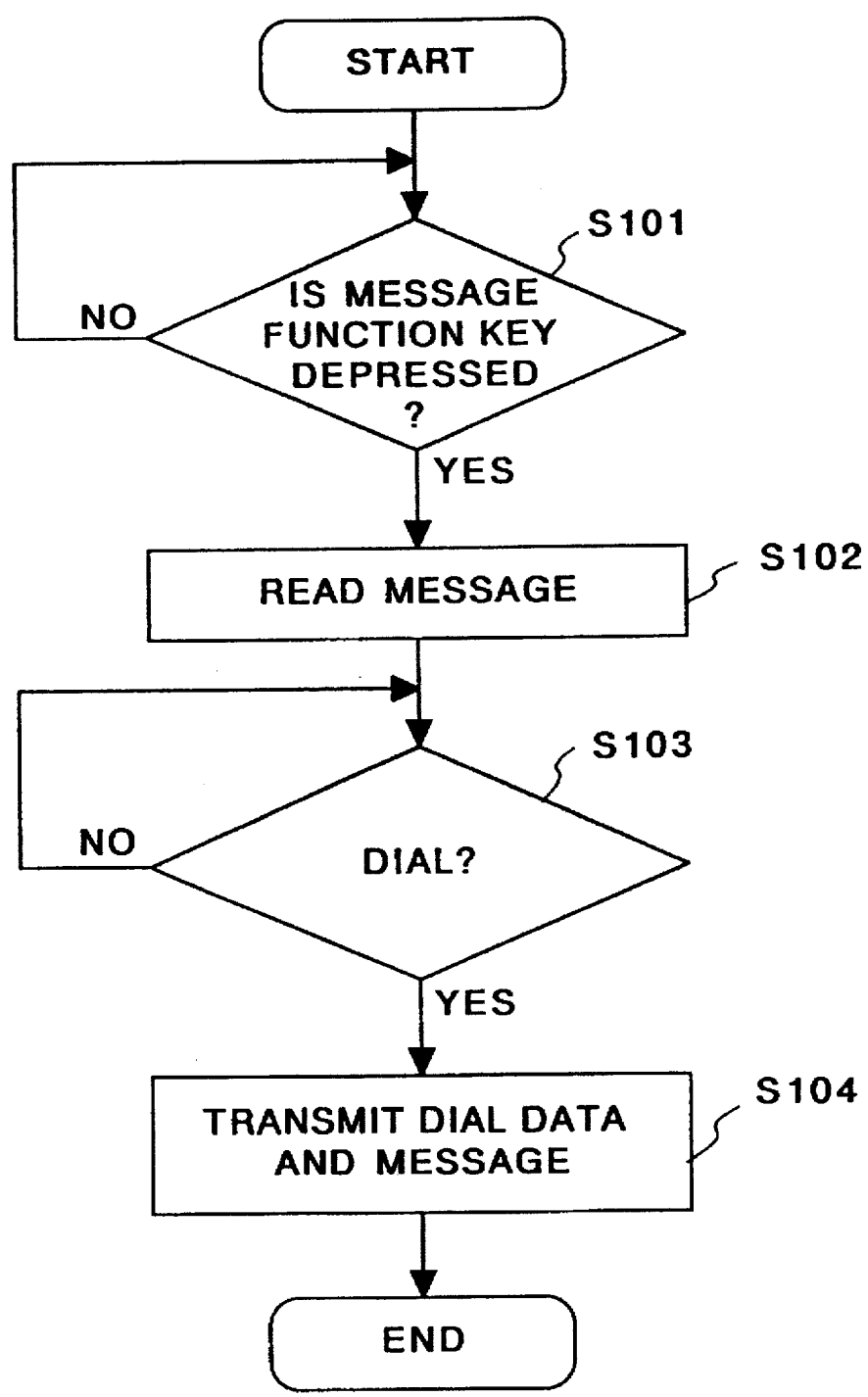
FIG. 11 is a flowchart showing a control sequence in an originating extension telephone according to the second embodiment.

FIG. 11 shows a processing at extension 1a, an originator.

Mr. A operates a keyboard of his electronic notebook 51, and inputs a message to be sent to Mr. B, for example, "Mr. C called. Please call him back.". Mr. A sets the electronic notebook at which he input the message on a base 204 while the input message is displayed. Furthermore, Mr. A depresses a data transmission key 6 to inform message transmission to a CPU 34 of the telephone 1a.

On the other hand, when the CPU 34 detects depression of the data transmission key (step S101), it reads the message input to the electronic notebook via an electronic notebook connection interface 40. A communication method between the extension telephone and the electronic notebook is the same as that in the first embodiment. The CPU 34 stores the read message in an internal RAM (step S102).

When Mr. A sets the telephone in an off-hook state, depresses the data transmission key 6, and dials an extension telephone number of Mr. B, the CPU 34 transmits off-hook data, message/voice data (data indicating whether a message transfer or a voice communication is performed), the message data in the internal RAM, and dial data to a main unit 13 via a communication LSI 40 (step S104). In this case, a communication method between the extension telephone and the main unit is the same as that in the first embodiment.

FIG. 12 is a main chart showing a control sequence of the main unit.

In FIG. 12, when a main CPU 19 of the main unit 13 receives data transmitted from the extension telephone 1a via an extension interface card 8 (step S201), it temporarily stores the received data in a RAM 21, and then reads out the message/voice data and the dial data from the RAM 21 to determine message transmission to the extension telephone 1d (step S202).

When the main CPU 19 determines message transmission to the extension telephone 1d, it informs the extension telephone 1d via the extension interface card 8 that a message is present (step S203).

Figure 13:
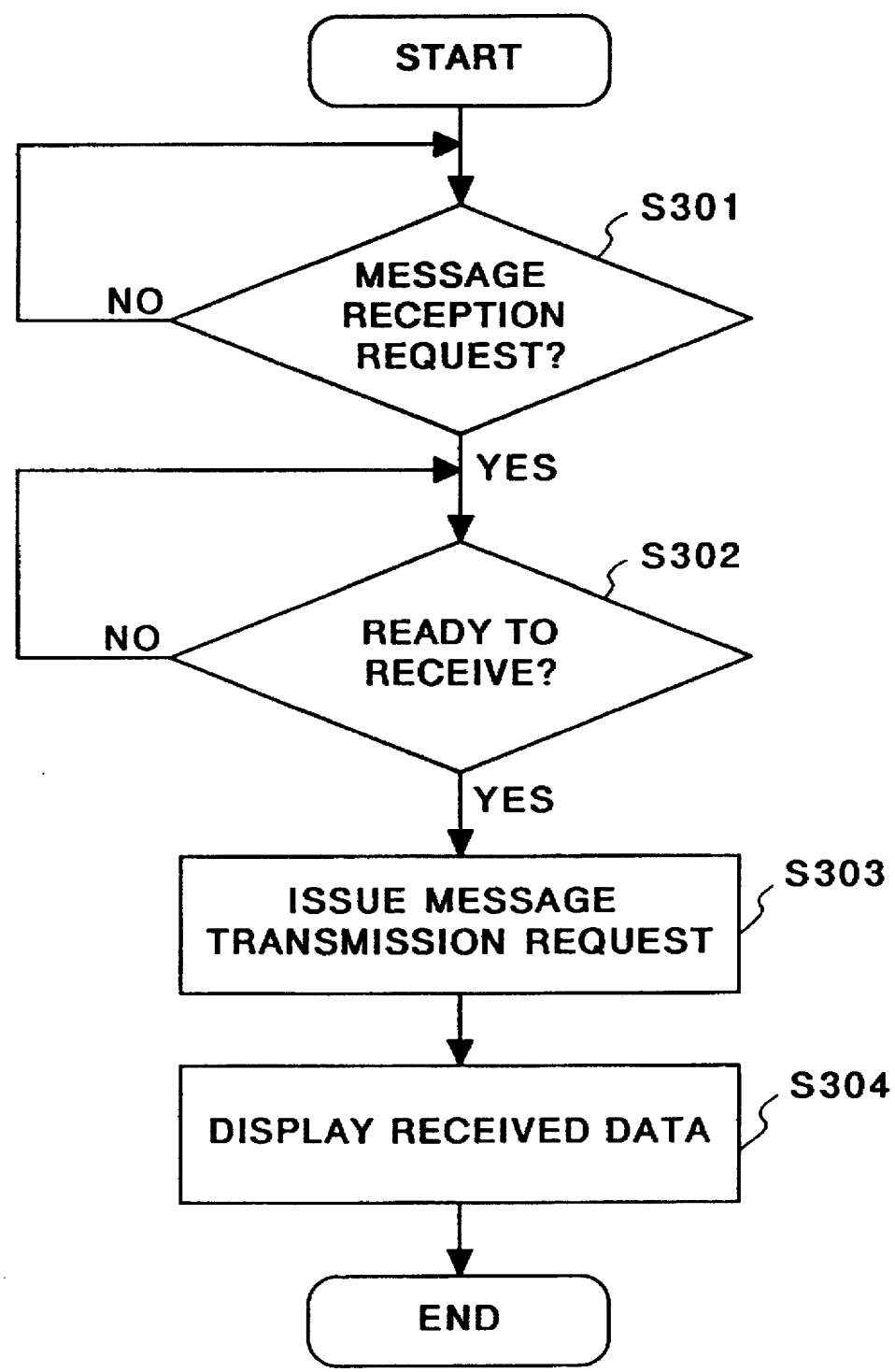
FIG. 13 is a flowchart showing a control sequence in a terminating extension telephone.

FIG. 13 shows a control sequence in the receiving extension telephone.

If the extension telephone 1d which has received information that the message is present (step S301) is ready to receive the message data (step S302), it informs the main unit 13 that it wants to receive the message (step S303).

The main CPU 19 of the main unit 13 which received the message reception request reads out the message data from the RAM 21, and transmits it to the extension telephone 1d.

The CPU 34 of the extension telephone 1d which received the message from the main unit 13 displays the received message on a display 39 (step S304) to inform Mr. B of the message "Mr. C called. Please call him back.".

As described above, according to this embodiment, a message stored in the electronic notebook can be transmitted from one telephone to a desired telephone by a simple operation.

[Modification]

Figure 14:
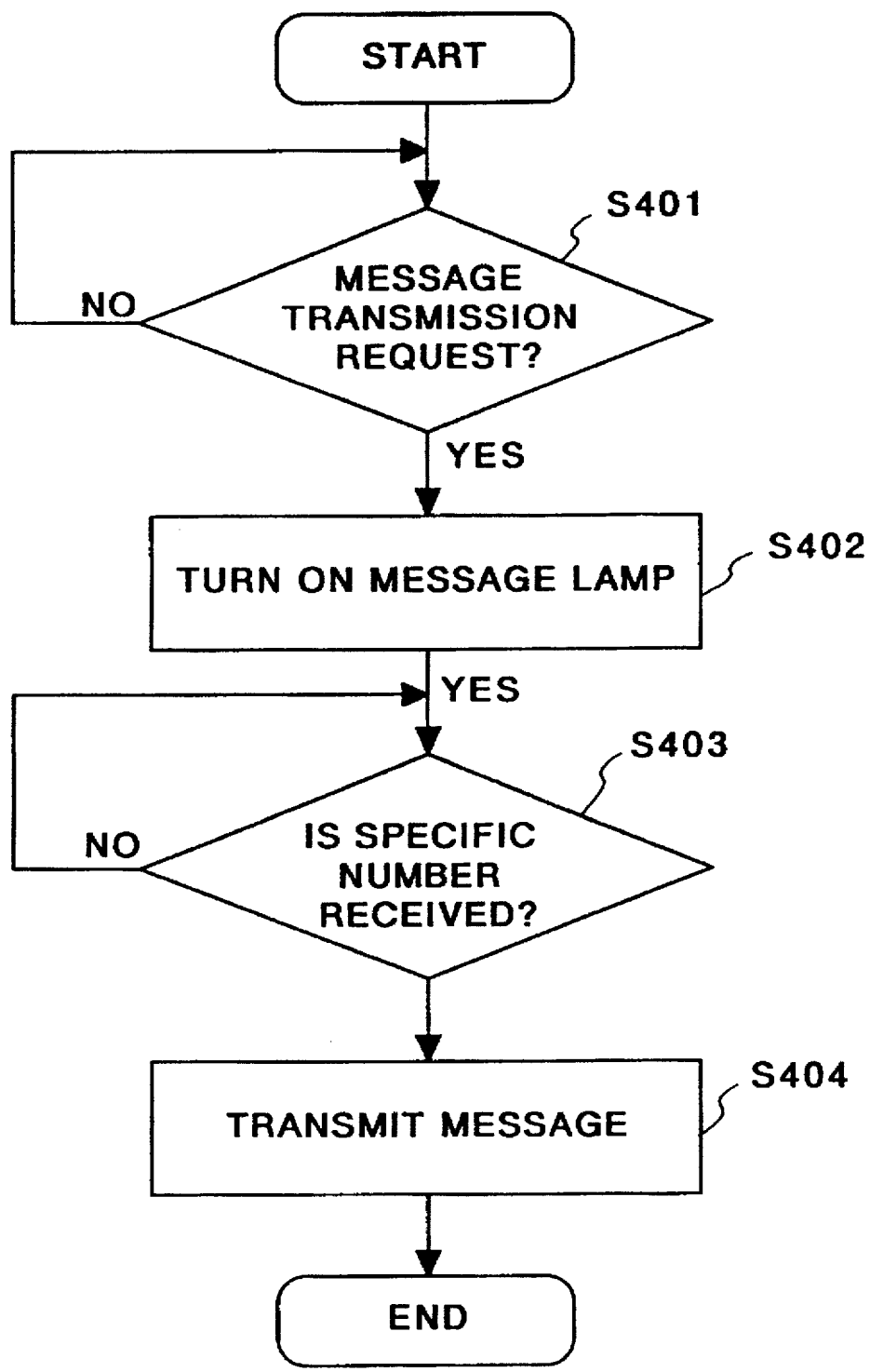
FIG. 14 is a flowchart showing a modification of the second embodiment.

In the second embodiment, a message is displayed as soon as a message terminating side receives the message. However, the message can be prevented from being read by a third party by not displaying it immediately after the reception. More specifically, as shown in FIG. 14, when the main CPU 19 receives a message transmission request (step S401), it causes a lamp (not shown) arranged on the extension telephone 1d on a message reception side and indicating the presence of a message to flash, or causes the liquid crystal display 39 to display a message indicating the presence of the message (step S402). When it is detected that a password unique to a user is input from a key input unit 46 of the extension telephone 1d (step S403), the main CPU 19 reads out the message from the RAM 21, and causes the liquid crystal display 39 to display the message (step S404).

In this manner, an arbitrary message can be accurately informed to the person whenever he or she desires the message to be delivered.

[Another Modification]

Another modification of the second embodiment will be described below.

Figure 15:
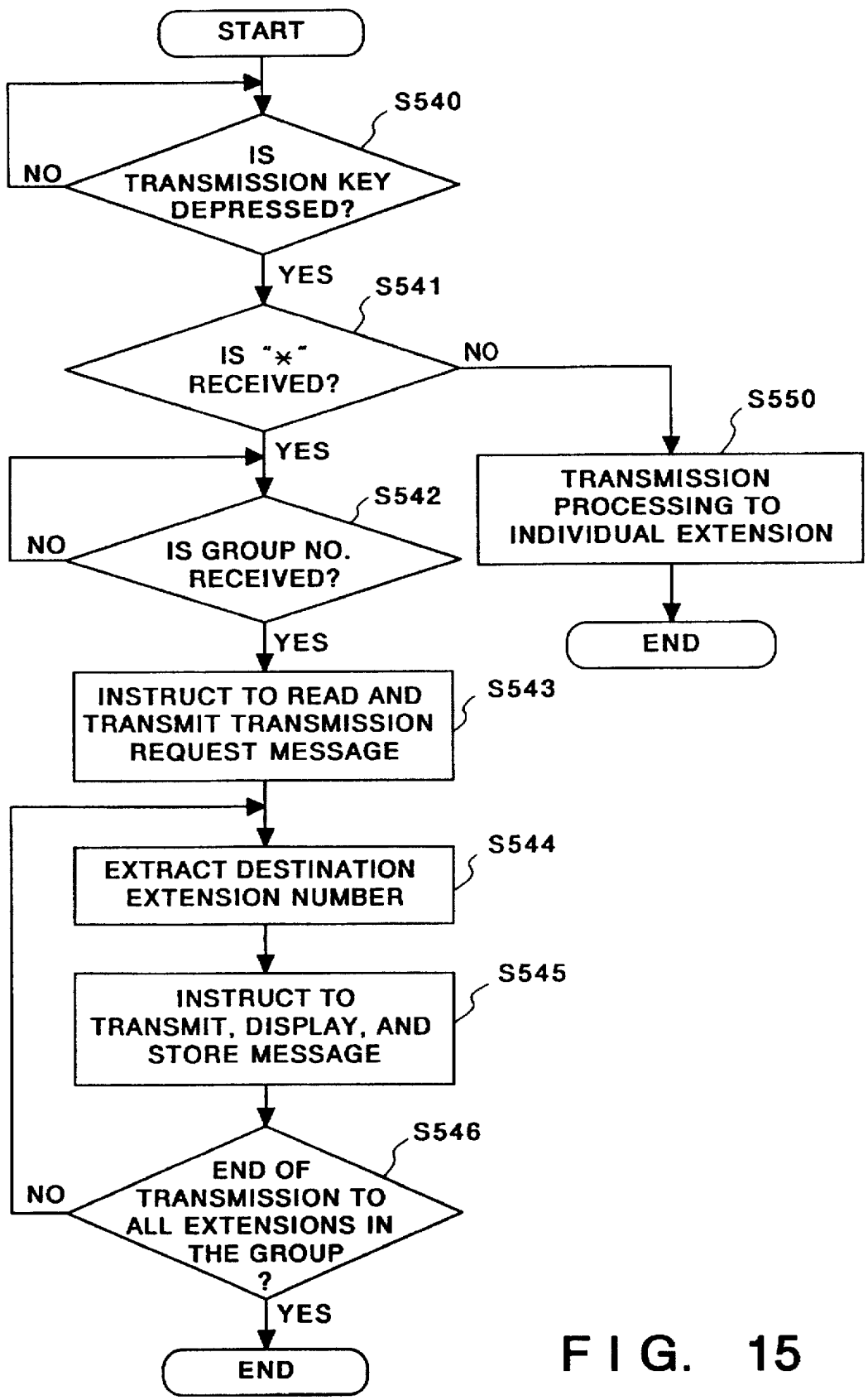
FIG. 15 is a flowchart showing another modification of the second embodiment.

FIG. 15 is a processing flowchart showing a sequence for transmitting a message from a transmitting side to a plurality of extension telephones according to this modification. FIG. 16 shows a diagram showing the construction of the RAM 21, and illustrates that extension numbers are stored in groups.

In FIG. 16, a memory area 50a stores a first group, and memory areas 51a to 54a store extension numbers. Memory areas 60a and 70a store second and third groups respectively.

The processing sequence of this modification will be described below with reference to the processing flowchart shown in FIG. 15.

An operator inputs a message to be transmitted (e.g., "meeting will be held at 3 o'clock today") in an electronic notebook in advance. And the electronic notebook is placed on the base 204 of the telephone of the transmitting side.

When the CPU 34 of the telephone detects depression of the data transmission key 6 of the key input unit 46 in step S540, it informs this operation to the main unit. The main CPU of the main unit is set in a standby state of receiving numerals in step S541. Furthermore, when the operator at the transmitting side inputs "*" using the ten-key pad, the CPU 34 detects it by the key input unit 46, and informs this operation to the main CPU 19. Thus, the main unit is set in a group number reception state. When a key input other than "*" is made, an extension number reception state is set in step S550 in the same manner as in the second embodiment, and communication processing to an individual extension is started.

On the other hand, when the main CPU 19 detects in step S542 that "1" is input from the ten-key pad of the telephone of the transmitting side as a group number, it searches the memory (RAM 21), as shown in FIG. 16, and recognizes that the group number is legal since the input number from the telephone of the transmitting side coincides with "1" in the memory area 50a. The flow then advances to step S543. The main CPU 19 extracts an extension number "10" from the memory area 51a, and determines a destination of a first transmission. In step S545, the CPU 19 instructs the extension telephone of the transmitting side at which the transmission key is depressed to transmit a message.

The extension telephone which received the transmission instruction supplies an instruction to the electronic notebook connection interface 40 to execute message reception in the telephone. More specifically, the CPU 34 sends a predetermined message transmission command to the electronic notebook to receive a message via the infrared light-receiving elements 37, and temporarily stores the received message in an internal RAM.

Upon completion of data storage in the internal RAM, the CPU 34 then issues a message transmission instruction to the main unit, and executes transmission.

In response to this, the main CPU 19 stores the message transmitted through the extension interface card 8 in the RAM 21, and starts message transmission to the extension number "10".

A destination extension telephone temporarily stores the message received through the communication LSI 40 in its internal RAM, and transmits the stored message to the liquid crystal display 39 to display it on the display. The CPU of this telephone also transmits the message to the electronic notebook connection interface 40, and sends a command to the electronic notebook by a transmission instruction. If transmission is permitted, the CPU transmits the message to cause the electronic notebook to display the message.

In step S546, it is checked if the message is transmitted to all of the extension telephones in the first extension group. If NO in step S546, the flow returns to step S544 to start message transmission to the next extension (an extension "11" in the memory area 52a in this modification).

Note that a message may be inhibited from being immediately displayed on a destination extension telephone, and may be kept stored in its internal RAM. Thus, only when a user of the destination extension telephone makes a display instruction (e.g., inputs a password), the message may be displayed.

In order to indicate urgency of a message, displayed characters may be flashed or blinked.

According to this modification, when a message is transmitted, a preset group number is input in place of an extension number of a destination telephone, so that a message can be easily transmitted to a plurality of extension telephones.

Therefore, when the same message is to be transmitted to a specific group, e.g., a given department, a given section, and the like of a corporate organization, there is no need to repeat the same transmission operation for each destination extension at a message transmitting side, thus eliminating a waste of time, and very cumbersome operations.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus which accommodates a plurality of terminals including a first terminal to which a portable information medium is connected and a second terminal which has manual input means, said apparatus comprising:

reception means for receiving a message from the portable information medium, via the portable information medium connected to the first terminal;

control means for controlling the second terminal so as to display that the message is received; and outputting means for outputting the message received by said reception means when a password is manually input from said manual input means of the second terminal so as to control displaying on the second terminal based on a message displayed on the portable information medium.

2. The apparatus according to claim 1, wherein said control means controls displaying on the second terminal designated by the first terminal.

3. The apparatus according to claim 1, wherein said control means causes the second terminal to show the existence of a message to be displayed on the second terminal.

4. A method for controlling a message transmission system which accommodates a plurality of terminals including a first terminal to which a portable information medium is connected and a second terminal which has manual input means, comprising the steps of:

receiving a message displayed on the portable information medium, via the first terminal;

controlling the second terminal so as to display that the message is received; and outputting the message displayed on the portable information medium and received in said receiving step to a display on the second terminal when a password is manually input from said manual input means of the second terminal.

5. The method according to claim 4, wherein the message is transmitted to the second terminal designated by the first terminal.

6. The method according to claim 4, wherein the message outputted in said outputting step is displayed at the second terminal.

7. A communication system which accommodates a plurality of terminals, said system comprising:

connecting means for connecting a portable information medium to the system;

storing means for storing information received from the portable information medium, corresponding to number data;

detecting means for detecting a caller ID when the system is called; and informing means for informing the plurality of terminals of the information stored in said storing means, corresponding to the number data which is coincident with the caller ID.

8. The system according to claim 7, wherein the information is displayed in the plurality of terminals.

9. The system according to claim 7, wherein the information indicates a number of the call originator.

10. A method for controlling a communication system which accommodates a plurality of terminals and a portable information medium, comprising the steps of:

storing information received from the portable information medium, corresponding to number data;

detecting a caller ID when the system is called; and informing the plurality of terminals of the information stored in said storing step, corresponding to the number data which is coincident with the caller ID.

11. The method according to claim 10, wherein the information is displayed in the plurality of terminals.

12. The method according to claim 10, wherein the information indicates a name of the call originator.

13. A communication system comprising:

a plurality of terminals including a first terminal to which a portable information medium is connected;

reception means for receiving a message from the portable information medium, via the portable information medium connected to the first terminal;

control means for controlling a second terminal so as to display that the message is received; and outputting means for outputting the message received by said reception means when a password is input from the second terminal, so as to control displaying on the second terminal based on a message displayed on the portable information medium, wherein the first terminal includes converting means for performing a format conversion on the message received from the portable information medium such that the message in a first format for transferring from the portable information medium to the first terminal, is converted into the message in a second format for transferring from the first terminal to the second terminal.

14. The system according to claim 13, wherein said control means causes the second terminal to show the existence of a message to be displayed on the second terminal.

15. The system according to claim 13, wherein said control means controls displaying on the second terminal designated by the first terminal.

16. The system according to claim 13, wherein the second terminal has manual input means for manually inputting the password.

17. The system according to claim 13, wherein the message is transferred from the portable information medium in accordance with a timing signal from the first terminal.

18. The system according to claim 13, wherein the second format includes a burst format.

19. A method for controlling a message transmission system which accommodates a plurality of terminals including a first terminal to which a portable information medium is connected, comprising the steps of:

receiving a message displayed on the portable information medium, via the first terminal;

controlling a second terminal so as to display that the message is received; and outputting the message displayed on the portable information medium and received in said receiving step when a password is input from the second terminal, wherein the message is converted in the first terminal such that the message in a first format for transferring from the portable information medium to the first terminal, is converted into the message in a second format for transferring from the first terminal to the second terminal.

20. The method according to claim 19, wherein the message is transmitted to the second terminal designated by the first terminal.

21. The method according to claim 19, wherein the message outputted in said outputting step is displayed at the second terminal.

22. The method according to claim 19, wherein the second terminal has manual input means for manually inputting the password.

23. The method according to claim 19, wherein the message is transferred from the portable information medium in accordance with a timing signal from the first terminal.

24. The method according to claim 19, wherein the second format includes a burst format.

* * * * *